United States Patent [19]

Keneavy

[11] Patent Number: 4,922,973
[45] Date of Patent: May 8, 1990

[54] COLLECTING VESSELS FOR COLLECTING REFRIGERANTS FROM HEAT EXCHANGE SYSTEMS AND METHODS

[75] Inventor: Bernie Keneavy, Cincinnati, Ohio

[73] Assignee: Coil Matic, Inc., Cincinnati, Ohio

[21] Appl. No.: 272,728

[22] Filed: Nov. 17, 1988

[51] Int. Cl.$^5$ .............................................. B65B 31/00
[52] U.S. Cl. .................................... 141/4; 141/11; 141/69; 141/82; 62/4; 62/47.1
[58] Field of Search .................. 141/11, 82, 4, 69; 62/77, 292, 149, 4, 47.1

[56] References Cited

U.S. PATENT DOCUMENTS

| | | | |
|---|---|---|---|
| 2,714,974 | 8/1955 | Sawyer | 222/94 |
| 2,882,692 | 4/1959 | Robbins | 62/4 |
| 2,898,744 | 8/1959 | Robbins | 62/4 |
| 2,907,173 | 10/1959 | Robbins | 62/4 |
| 2,916,886 | 12/1959 | Robbins | 62/4 |
| 2,925,719 | 2/1960 | Robbins et al. | 62/4 |
| 3,058,313 | 10/1962 | Robbins | 62/4 |
| 3,095,291 | 6/1963 | Robbins | 62/4 |
| 3,149,943 | 9/1964 | Amador | 62/4 |
| 3,175,558 | 3/1965 | Caillouette et al. | 128/403 |
| 3,232,070 | 2/1966 | Sparano | 62/149 |
| 3,463,161 | 8/1969 | Andrassy | 128/402 |
| 3,542,032 | 11/1970 | Spencer, Jr. | 128/399 |
| 3,545,230 | 12/1970 | Morse | 62/530 |
| 3,614,875 | 10/1971 | McCallun | 62/400 |
| 3,643,665 | 2/1972 | Caillouette | 128/403 |
| 3,674,134 | 7/1972 | Turner | 206/474 |
| 3,736,769 | 6/1973 | Petersen | 62/530 |
| 3,802,215 | 4/1974 | Rowe | 62/259 |
| 3,874,504 | 4/1975 | Verakas | 206/219 |
| 3,887,346 | 6/1975 | Erdman | 62/4 |
| 3,950,158 | 4/1976 | Gossett | 62/4 |
| 3,957,472 | 5/1976 | Donnelly | 62/4 |
| 4,010,620 | 3/1977 | Telkes | 62/2 |
| 4,049,408 | 9/1977 | Patel | 62/4 |
| 4,138,560 | 2/1979 | Hillenbrand et al. | 544/203 |
| 4,344,303 | 8/1982 | Kelly, Jr. | 62/530 |
| 4,382,446 | 5/1983 | Truelock et al. | 128/402 |
| 4,448,702 | 5/1984 | Kaes | 252/70 |
| 4,462,224 | 7/1984 | Dunshee et al. | 62/530 |
| 4,483,157 | 11/1984 | Human | 62/400 |
| 4,556,091 | 12/1985 | Poulsen | 141/82 |
| 4,592,358 | 6/1986 | Westplate | 128/402 |
| 4,653,290 | 3/1987 | Byrne | 62/372 |
| 4,676,247 | 6/1987 | Van Cleve | 62/530 |
| 4,688,572 | 8/1987 | Hubbard et al. | 62/530 |
| 4,689,165 | 8/1987 | Kardos et al. | 252/75 |
| 4,761,961 | 8/1988 | Marx | 62/292 |
| 4,766,733 | 8/1988 | Scuderi | 62/292 |
| 4,802,343 | 2/1989 | Rudick et al. | 62/400 |

OTHER PUBLICATIONS

"Rejuvenator," Advertisement.

*Primary Examiner*—Henry J. Recla
*Assistant Examiner*—Edward C. Donovan
*Attorney, Agent, or Firm*—Wood, Herron & Evans

[57] ABSTRACT

A Freon type refrigerant, which is vented from a heat exchange system, such as an air-conditioner, is transferred directly from the exhaust valve of the heat exchange system through a tube to a collecting cylinder or tank. The outer metal side walls of the collecting tank are wrapped with a chemically activatable cold wrap. The cold wrap may, for example, contain therein a rupturable pouch having a chemical blend of ammonium nitrate and urea to isolate same from water within the cold wrap. Upon rupturing of the pouch, the chemical blend is dissolved in the water and an endothermic reaction is initiated. As a result, the heat within the tank is absorbed therefrom by the cold wrap causing the temperature and pressure inside of the tank to drop. This permits substantially all of the refrigerant in the heat exchange system to be transferred into the chilled tank in a condensed or liquid state. Alternately, a series of coils in contact with a chemically activatable cold wrap can be used to also assist the refrigerant to flow from a heat exchange system into a collecting tank in a condensed or liquid form.

17 Claims, 1 Drawing Sheet

COLLECTING VESSELS FOR COLLECTING REFRIGERANTS FROM HEAT EXCHANGE SYSTEMS AND METHODS

BACKGROUND

Compressor type heat exchange systems generally comprise a compressor in combination with a refrigerant either to absorb heat from or to release heat into ambient atmosphere. In either case, this is accomplished by cycling a gaseous refrigerant through the heat exchange system under pressure. More particularly, a compressor of the heat exchange system compresses the gaseous refrigerant cycled therethrough into a liquid so that the expansion and contraction properties of the refrigerant may be utilized to alter the temperature of the refrigerant and effect heat absorption.

There are generally two types of compressor heat exchange systems. There is an air-conditioning or refrigeration system which is designed to take heat from a building or an enclosure, respectively, and transfer it to ambient environment. There is also a heat pump system which is designed so that it can take heat from the ambient environment and transfer it into the interior of a building, or it can reverse the action and function as an air-conditioning or refrigeration system.

As already recited above, both of these heat exchange systems rely upon a refrigerant in a pressurized state to alter temperature. The most common of these refrigerants are halogenated hydrocarbons, particularly chlorofluorocarbons (CFCs) such as dichlorodifluoromethane and the like. The CFCs are generally referred to as freons, and they normally exist in a gaseous state under ambient conditions. When CFCs are introduced into heat exchange systems, however, the compressors utilize work to place the refrigerants in a pressurized state and convert them into liquid form.

Because air-conditioning and refrigeration systems are usually operated heavily during the warmer months of the year, it is not uncommon for the refrigerants, which are being continuously cycled therethrough, to become contaminated with particulate or liquid matter. Unfortunately, in those situations where the refrigerants are permitted to become too contaminated, their ability to transfer heat is dramatically reduced due to the degradation of their thermal dynamic properties. To avoid such a problem, it has been the standard practice in the industry to periodically replace the refrigerants.

In addition to replacing contaminated refrigerants, air-conditioning and refrigeration systems on occasion become disabled requiring repair. During such repair, it is likewise necessary to remove the refrigerants from such systems. If the compressors are functioning, the people servicing such systems are fortunate in that they can utilize the compressors to force the refrigerants into collecting cylinders. If, however, the compressors are disabled, the service people must resort to other means to transfer the refrigerants into the collecting cylinders. This is particularly troublesome for the service people by reason of the fact that they are unable to determine if the compressors are functioning until actual inspection thereof and that such systems are normally located in remote, difficult-to-reach places, such as on rooftops.

Today, there are available separate mechanical units adapted to collect and decontaminate refrigerants from heat exchange systems. Exemplary of such mechanical units are disclosed in U.S. Pat. Nos. 4,539,817 and 3,232,070. Although these mechanical units are ideally suited to service air-conditioning units in automobiles, and units located at ground level, they do not provide a realistic solution to the above problem. First of all, such mechanical units are relatively bulky, heavy pieces of equipment often weighing in excess of 100 lbs. Secondly, since most heat exchange systems, such as air-conditioning units for office and industrial establishments and the like, are located in inaccessible areas, such as on rooftops where ladders are the only mode of access, it is virtually impossible to service such heat exchange systems with these mechanical units. Simply put, these mechanical units are too large and too heavy to pick-up and carry. This is evidenced by the fact that these mechanical units are typically mounted on wheels to counter their weight and bulkiness, and to improve their portability.

In the past, when replacing contaminated refrigerants or servicing disabled heat exchange systems, the practice was simply to tap open such systems, vent the refrigerants into the environment, service the systems if necessary, and introduce fresh, decontaminated refrigerants into the systems. Up to now, this has been a widely accepted practice in the industry for two reasons. First, there has been no governmental restrictions prohibiting the release of such refrigerants into the environment. And second, the cost of new refrigerants is negligible.

However, this practice is rapidly changing because of the negative environmental impact which the CFCs have had on the ozone layer. According to the Environmental Protection Agency (EPA), refrigerants such as the CFCs can no longer be vented to atmosphere and must be collected and properly disposed of or reused. In addition, since the cost of the refrigerants is continuing to rise, it is becoming economically prudent to rejuvenate and reuse refrigerants rather than to vent them into the environment. This is particularly true in view of the fact that decontaminated refrigerants can be reused and that there is a simple and economical process available today for decontaminating refrigerants such as CFCs once they have been collected.

Other than the use of undisabled compressors or mechanical units to compress the refrigerants removed from the heat exchange units into collecting cylinders, the alternate method available today is to simply reduce the pressure within a collecting cylinder by chilling the cylinder so that the refrigerants can be collected therein in liquid form. As the refrigerants enter the chilled collecting cylinders, the reduced pressure and cooler environments within the interiors thereof keep the refrigerants in a condensed or liquid condition and flowing from the heat exchange systems into the chilled cylinder i.e., the refrigerants flow from hot to cold. Normally, refillable 20-50 lb. or larger collecting cylinders are employed, and when used for this purpose, they are typically filled with refrigerants to about 80% of their capacity.

The above described procedure has been accomplished heretofore by exposing the outer surface of the collecting cylinders to dry ice. Unfortunately, the use of dry ice is not without its drawbacks. For instance, dry ice is very heavy, it is dangerous and difficult to handle due to its extremely low temperatures, and it is not readily available due to the fact that it cannot be stored over long periods of time under these types of working conditions. Moreover, since service people, when servicing disabled heat exchange systems, are unable to determine if the compressors are functioning until they actually inspect same, the service people do not know if dry ice should initially be brought with them to the sites. Accordingly, even though dry ice has had limited practicality in chilling exterior surfaces of collecting cylinders for reclaiming refrigerants from heat exchange systems, dry ice is generally unsuited for use in this application.

Consequently, there is an immediate commercial need to improve the process of collecting contaminated refrigerants or refrigerants from disabled heat exchange systems located in remote, difficult-to-reach locations, such as on rooftops, without having to resort to the use of dry ice or bulky, heavy mechanical units.

SUMMARY OF THE INVENTION

In brief, the present invention alleviates the above-referenced problems and shortcomings of the present state of the art through the discovery of a novel, yet simple method to collect refrigerants from heat exchange systems. Broadly speaking, the present invention is premised on the realization that a refrigerant can be collected in a collecting cylinder by chilling the cylinder with a chemically activatable cold wrap. More particularly, one method of the present invention can be accomplished by surrounding the collecting cylinder with a chemically activatable cold wrap which is of a size large enough to substantially cover the outer walls of the cylinder and capable of reducing the internal temperature and pressure of the cylinder, activating the cold wrap, and collecting the refrigerant in the chilled cylinder in a condensed or liquid state. By surrounding the collecting cylinder with the cold wrap and activating it, the heat within the cylinder is believed to be absorbed therefrom by the wrap causing the internal temperature and pressure in the cylinder to drop. As a result, the refrigerant within the heat exchange system will flow into the chilled cylinder in a condensed or liquid state.

Another method falling within the contemplation of this invention is the use of a chemically activatable cold wrap in combination with a series of coils connecting a heat exchange system to a collecting cylinder. In use, the cold wrap when activated will reduce the temperature and pressure inside of the coils so that the refrigerant will flow from the heat exchange system into the cylinder via the chilled coils in a condensed or liquid form.

The above features and advantages of the present invention will be better understood with reference to the accompanying figs. and detailed description. It should also be understood that the particular methods, articles and compositions illustrating the invention are exemplary only and not to be regarded as limitations of the invention.

BRIEF DESCRIPTION OF THE FIGS.

Reference is now made to the accompanying figs. in which is shown illustrative embodiments of the present invention from which its novel features and advantages will be apparent:

DETAILED DESCRIPTION OF THE INVENTION

By way of illustrating and providing a more complete appreciation of the present invention and many of the attendant advantages thereof, the following detailed description is given concerning the novel articles and methods of use thereof.

According to one aspect of the present invention, a refrigerant is vented from a heat exchange system into a collecting cylinder. For purposes of the present invention, the heat exchange system can be, for instance, a heat pump, an air-conditioning system or a refrigeration unit. All of these systems employ a compressor to compress the refrigerant introduced therein so that the expansion and contraction properties of the refrigerant can be utilized to absorb heat. This is accomplished as earlier discussed by continuously cycling the refrigerants through these heat exchange systems under pressure in a condensed or liquid form.

Figure 2:
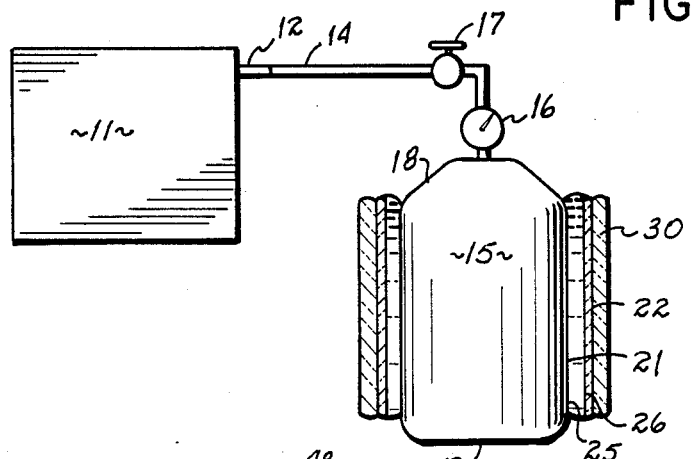
FIG. 2 is a cross-sectional diagrammatical view of a holding cylinder in combination with a chemically activatable coil wrap for use in the present invention.

Now turning to FIG. 2, a heat exchange system 11 is generally shown. It includes a vent 12 to release a refrigerant therefrom. The refrigerant may be any of a variety of different halogenated hydrocarbons such as the chlorofluorocarbons (CFCs). One of the most commonly used refrigerants in the industry is R-12 or Freon-12 sold by DuPont. This is a dichlorodifluoromethane.

As illustrated in more detail in FIG. 2, a tube 14 connects vent 12 with a collecting cylinder 15 through valve 16. The collecting cylinder 15 is a sealed metal tank that includes an externally threaded inlet 17 which leads to valve 16 and into the interior of the collecting cylinder 15. As further shown in FIG. 2, collecting cylinder 15 includes a top wall 18, a bottom wall 19 and a cylindrical side wall 21.

Standard collecting cylinders used to reclaim and store vented refrigerants generally can have diameters from about 12½ to about 17 inches and a height of about 18 inches. These metal cylinders are well known to those versed in this art and generally hold from about 20 to 50 lbs. of condensed refrigerant. Notwithstanding, such collecting cylinders when used for this purpose will normally be filled to only about 80% of their filling capacity, i.e., 16 lbs. of condensed refrigerant for a 20 lb. tank and 40 lbs. of condensed refrigerant for a 50 lb. tank. This is believed to be due to the internal pressure within the cylinder.

With further reference to FIG. 2, the collecting cylinder 15 is encased or encircled by a chemically activatable cold wrap 22. As shown more particularly in FIG. 1, chemically activatable cold wrap 22 is an elongated plastic pouch. Within the interior of cold wrap 22 is a rupturable pouch 23. Also included within the interior of cold wrap 22 is a particulate material 24. Rupturable pouch 23 is filled with a heat exchange liquid such as water. The particulate material 24 in cold wrap 22 is of course separated from the heat exchange liquid until pouch 23 is ruptured. Rupturable pouch 23 therefore should be formed out of any material which is suitable for rupturing on demand and for isolating the heat exchange liquid from the particulate material 24 until the pouch is selectively ruptured.

Upon rupturing pouch 23, the particulate material 24 is dissolved in the heat exchange liquid to initiate an endothermic reaction for absorbing heat. The inner side of cold wrap 22 is a heat exchange surface 25 which on one side thereof is in direct contact with the heat exchange liquid and on the other side thereof is in direct contact with outer cylindrical side wall 21 of collecting cylinder 15. Outer surface 26 of cold wrap 22 is exposed to ambient when cold wrap 22 is positioned around collecting cylinder 15. Outer surface 26 preferably is formed of any suitable insulating material. Optionally, a layer of insulation 30 may be attached to or fitted over the outer surface 26 of cold wrap 22. The layer of insulation 30 can be formed of any suitable material, such as foam, rubber, styrofoam, urethane, aluminum or the like, and can be integrally attached to outer surface 26 of cold wrap 22. Alternatively, insulation layer 30 may be wrapped around outer surface 26 of cold wrap 22 and affixed thereon by any suitable means.

Figure 1:
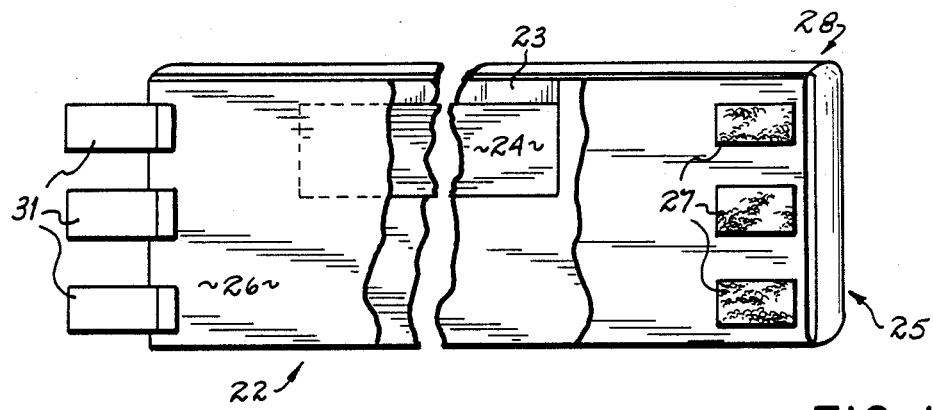
FIG. 1 is a perspective view of a chemically activatable cold wrap for use in the present invention.

Now turning to FIG. 1, outer surface 26 of cold wrap 22 includes a fastener which is a hook and pile type fastening mechanism. This hook and pile type fastening mechanism includes a plurality of pile members 27 adhered to one end 28 of cold wrap 22. Adhered to the opposite end of 29 of cold wrap 22 are complimentary strips of a hook material 31 which are adapted to stick on to the pile portions 27. These fasteners are commonly referred to under the trademark as VELCRO. Of course, if insulating layer 30 is integrally attached to outer surface 26 of cold wrap 22, the pile members 27 and the strips of hook material 31 of the hook and pile fastening mechanism will be adhered to the outer surface of insulation layer 30 rather than to the outer surface 26 of cold wrap 22.

Chemically activatable cold wraps are well known to those versed in the medical field and can incorporate a variety of different chemicals or blends thereof. Exemplary of such chemically activatable cold wraps are disclosed in Caillouette et al, U.S. Pat. No. 3,175,558, Truelock et al, U.S. Pat. No. 4,382,466, Hubbard, U.S. Pat. No. 4,688,572, Cardos et al, U.S. Pat. No. 4,689,165 and Van Cleve, U.S. Pat. No. 4,676,247, all of which are incorporated herein by reference in their entireties. It should be understood, that the chemically activatable cold wraps disclosed in these patents are merely exemplary and that there are a large number of other cold wraps which are known and used for generally medicinal purposes that can likewise be used with the teachings of this invention.

The particulate material 24 as indicated is a chemical or blend of chemicals which upon dissolution in the heat exchange fluid will initiate an endothermic reaction. Typically, the heat exchange liquid will be water and the chemical 24 can be ammonium nitrate, urea, formamide or the like. These chemicals are well known and their chemical reactions are also well known. One formulation suitable for use with this invention contains by weight upon dissolution of about 38% ammonium nitrate, about 31% urea, and about 31% water.

For purposes of the present invention, sufficient heat exchange liquid and chemical 24 should be provided to ideally lower the temperature of the interior of the cylinder 15 from ambient to about 40° F. for about 10-20 minutes. By reducing the internal temperature of a collecting cylinder 15 to about 40° F., it is believed that the amount, rate and physical state at which the refrigerant is transferred will be maximized. It should be understood, however, all that is necessary to collect a refrigerant from a heat exchanger into a collecting cylinder is to reduce the internal temperature and pressure of the collecting cylinder by only a few degrees below that temperature inside of the heat exchanger to effect the transfer of the refrigerant from the heat exchanger into the collecting cylinder in a condensed or liquid state.

In practice, if a cold wrap comprises 38% ammonium nitrate, 31% urea and 31% water, it is believed that about 1 lb. of the mixture in a cold wrap is required for about every 2 lbs. of refrigerant to be reclaimed. This is believed to represent a ball park figure when selecting a cold wrap for use in accordance with this invention. Thus, if the collecting cylinder is capable of holding 20 lbs. of a condensed refrigerant, a cold wrap containing at least about 8 lbs. of chemical mixture should be used to ensure that the internal temperature and pressure of the cylinder is sufficiently reduced to effect transfer of 16 lbs. of condensed refrigerant into the cylinder, i.e., about 80% of the filling capacity of the cylinder.

In practicing the present invention, the refrigerant vent 12 of heat exchanger 11 is connected to the externally threaded inlet 17 of cylinder 15 using tube 14. Cylinder 15 is preferably first wrapped with cold wrap 22 by simply placing it around the outer surface 21 of cylinder 15 and fastening it via complimentary hook and pile fasteners 31 and 27. This puts the heat exchange surface 25 of cold wrap 22 directly in contact with the cylindrical outer metal walls 21 of cylinder 15. In this arrangement, the insulated outer surface 26 of cold wrap 22 is exposed to ambient.

Pouch 23 of cold wrap 22 is then ruptured causing the heat exchange liquid to come into contact with the particulate chemical material 24 to initiate an endothermic reaction and to absorb heat. This in effect will reduce the temperature and pressure in the interior of cylinder 15. Cold wrap 22 can then be covered with insulation layer 30. Valve 16 is then opened to permit the refrigerant in heat exchanger 11 to flow into cylinder 15 in a condensed or liquid state. It should be understood that the present invention also contemplates rupturing rupturable pouch 23 before encircling cylinder 15 with cold wrap 22 and that insulation layer 30 may be fitted over cold wrap 22 after valve 16 is vented open.

Pressure within the heat exchanger 11 will initially force refrigerant to pass through line 14 into now chilled cylinder 15. The cooling action of the cold wrap 22 will cause the refrigerant to continue to flow into the chilled cylinder 15 and it will act to keep the refrigerant in a condensed or liquid state. This is believed to be due to the reduction achieved in temperature and pressure inside of cylinder 15. Upon reaching equilibrium, generally after cylinder 15 has been filled to about 80% of its filling capacity, valve 16 is closed and either fresh, decontaminated refrigerant can be introduced into the heat exchanger 11 or heat exchanger 11 can now be serviced with fresh, decontaminated refrigerant being introduced thereafter. In either event, the refrigerant has been removed from heat exchanger 11 without venting it into the environment and without the use of dry ice or the bulky, heavy mechanical units referred to earlier herein.

Figure 3:
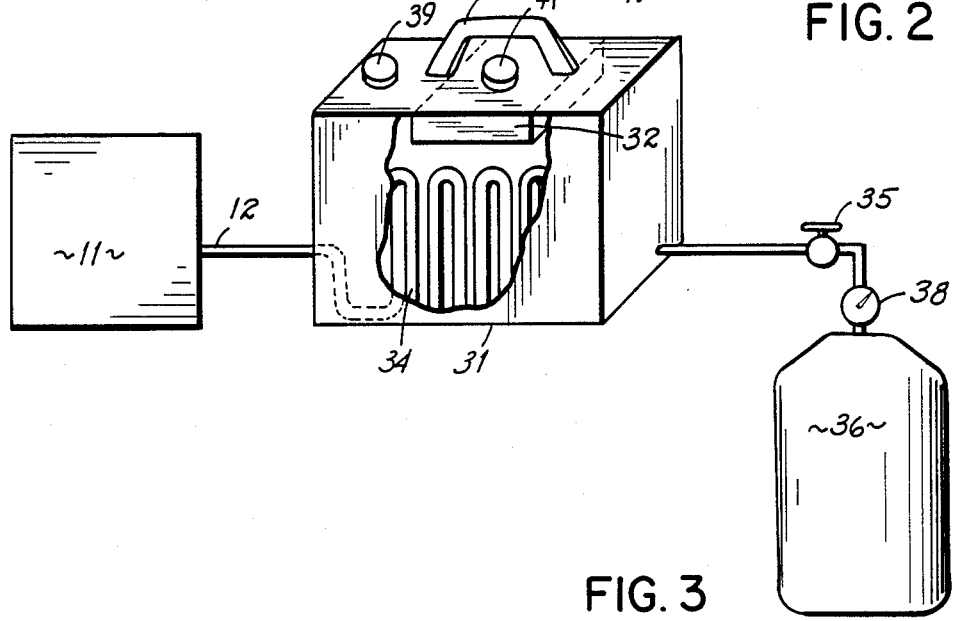
FIG. 3 is a diagrammatical view of an alternate embodiment of the present invention.

An alternate embodiment of the present invention is shown in FIG. 3. More particularly, in this embodiment, a cooling wrap is in the form of a box 31 wherein the interior is filled with a heat exchange liquid. The top of box 31 includes a compartment 32 containing a chemical identical to that described earlier herein which upon dissolution in the heat exchange liquid will cause an endothermic reaction to occur. A tubular serpentine member or a series of coils 34 extends from the refrigerant outlet 12 of heat exchanger 11 through the interior of box 31 in contact with the heat exchange liquid to the opposite side of box 31 and connects to the internally threaded inlet 35 of cylinder 36.

In use, compartment 32 is opened allowing the chemical therein to mix with the heat exchange liquid causing an endothermic reaction and heat to be absorbed from the interior of coils 34. Valve 38 of tank 36 is then opened allowing the refrigerant to pass from port 12 through chilled coils 34 where it should remained in a condensed or liquid state while passing through chilled coils 34 within box 31. The refrigerant will then flow into cylinder 36 and can be stored as a liquid until rejuvenated. In this embodiment, box 31 may include an inlet port 39 and compartment 32 may include an inlet port 41 so that the heat exchange liquid within box 31 and the chemical within the compartment 32, respectively, can be added at or prior to reaching the site and replaced after use thereof. Handle 42 attached to box 31 provides for easy transport.

Alternately, instead of having an unitary cooling box 31, a series of coils could simply be run through a container which includes a plurality of individual cold wraps. This obviously will have the same heat exchange effect as cooling box 31. In yet another alternative to the unitary cooling box 31, a unitary cold wrap designed to effectively cover the series of serpentine coils could be employed.

By now, it should be readily apparent to those versed in this field that by using the present invention one can simply, yet effectively collect substantially all of a refrigerant in a heat exchange unit for rejuvenation and reuse. Moreover, the burden and disadvantages that heretofore have been associated with collecting refrigerant from heat exchange units located particularly n remote difficult-to-reach locations have been reduced if not outright eliminated by utilizing the teachings of the present invention. For instance, since used refrigerant can be collected and rejuvenated inexpensively, the cost of new refrigerants is saved. Moreover, the present invention enables repair people to store cold wraps within their trucks at all times. In addition, the cold wraps can be conveniently carried to the service sites prior to inspection of heat exchange systems even when such systems are located in difficult-to-reach places. Further, the cold wraps of the present invention eliminate the need to resort to the use of dry ice or the bulky, heavy mechanical units and the disadvantages of using same. Still further, the cold wraps easily and effectively conform to the shape of the cylinders to maximize heat absorption therefrom. On the other hand, with dry ice, heat transfer is less effective in view of the difficulty of surrounding the collection cylinders with the dry ice. In all, the present invention provides a solution to the problem of collecting refrigerants from heat exchange systems located in inaccessible places.

The present invention may, of course, be carried out in other specific ways than those herein set forth without departing from the spirit and essential characteristics of the present invention. The present embodiments are, therefore, to be considered in all respects as illustrative and not restrictive and any changes coming within the meaning and equivalency range of the appended claims are to be embraced therein.

What is claimed is:

1. A method of transferring a low-boiling refrigerant from a heat exchange unit, such as refrigerative and air conditioning units, into the interior of a collecting vessel without releasing the refrigerant to atmosphere, said method comprises:

absorbing an effective amount of heat from the interior of the collecting vessel via an activated chemically activatable cold wrap positioned on an exterior wall of the collecting vessel for effecting the transfer of the refrigerant from the heat exchange unit into the interior of the collecting vessel in a condensed state, the chemically activatable cold wrap having reactive chemicals separated from one another when the cold wrap is in its non-use state whereby, upon mixing the reactive chemicals within the cold wrap, the reactive chemicals react with one another to produce an endothermic reaction which effectively cools the interior of the collecting vessel.

2. A method of claim 1, the reactive chemicals being a liquid reactive chemical and a particulate reactive chemical.

3. A method of claim 1, the reactive chemicals comprising a liquid reactive chemical and two distinct particulate reactive chemicals wherein the liquid reactive chemical is separated from the particulate reactive chemicals when the chemically activatable cold wrap is in its non-use state, the liquid reactive chemical being water and the two particulate reactive chemicals being ammonium nitrate and urea.

4. A method of claim 1 wherein the collecting vessel holds from about 20 pounds to about 50 pounds by weight of refrigerant.

5. A method of claim 1 wherein the chemically activatable cold wrap comprises an elongated pouch having fastening means to hold a first end of the pouch to a second end of the pouch with the pouch encircling and engaging the exterior wall of the collecting vessel.

6. A method of claim 5 wherein the fastening means to hold the first end of the pouch to the second end of the pouch comprises a hook and pile type fastener.

7. A method of claim 5 wherein the chemically activatable cold wrap includes a first heat exchange surface and a second insulating surface located immediately adjacent to the first heat exchange surface wherein the first heat exchange surface is in direct contact with the exterior wall of the collecting vessel when the chemically activatable cold wrap is positioned on the exterior wall of the collecting vessel.

8. A method of claim 1 including the further step of positioning the chemically activatable cold wrap on the exterior wall of the collecting vessel.

9. A method of claim 1 including the further step of activating the chemically activatable cold wrap positioned or to be positioned on the exterior wall of the collecting vessel, said activation step comprises mixing the separated reactive chemicals within the wrap together to cause the reactive chemicals to react with one another to produce an endothermic reaction which effectively cools the interior of the collecting vessel.

10. A method of claim 1 including the further step of transferring the refrigerant from the heat exchange unit into the hollow interior of the collecting vessel in a condensed state following activation of the chemically activatable cold wrap positioned on the exterior wall of the collecting vessel.

11. A collecting vessel for receiving a refrigerant which has been cycled through a heat exchange unit, such as refrigerative and air-conditioning units, said collecting vessel comprising:

an exterior wall defining a hollow interior;

valve means for opening and closing said collecting vessel to permit the refrigerant to flow into and out from the hollow interior when said valve means is opened or closed, respectively; and a chemically activatable cold wrap positioned on said exterior wall for absorbing an effective amount of heat from the hollow interior of said collecting vessel when in its activated state to effect transfer of the refrigerant from the heat exchange unit into the hollow interior of said collecting vessel in a condensed state, said chemically activatable cold wrap comprising reactive chemicals separated from one another when said cold wrap is in its non-use state whereby, upon activating said cold wrap, the reactive chemicals are mixed together to cause them to react with each other to produce an endothermic reaction which effectively cools the hollow interior of said collecting vessel.

12. A collecting vessel of claim 11, said reactive chemicals being a liquid reactive chemical and a particulate reactive chemical.

13. A collecting vessel of claim 11, said reactive chemicals comprising a liquid reactive chemical and two distinct particulate reactive chemicals wherein the liquid reactive chemical is separated from the particulate reactive chemicals when said chemically activatable cold wrap is in its mon-use state, the liquid reactive chemical being water and the two particulate reactive chemicals being ammonium nitrate and urea.

14. A collecting vessel of claim 11 wherein said collecting vessel holds from about 20 pounds to about 50 pounds by weight of refrigerant.

15. A collecting vessel of claim 11 wherein said chemically activatable cold wrap comprises an elongated pouch having fastening means to hold a first end of said pouch to a second end of said pouch with said pouch encircling and engaging said exterior wall of said collecting vessel.

16. A collecting vessel of claim 15 wherein said fastening means to hold said first end of said pouch to said second end of said pouch comprises a hook and pile type fastener.

17. A collecting vessel of claim 15 wherein said chemically activatable cold wrap includes a first heat exchange surface and a second insulating surface located immediately adjacent to said first heat exchange surface wherein said first heat exchange surface is in direct contact with said exterior wall of said collecting vessel.

* * * * *

UNITED STATES PATENT AND TRADEMARK OFFICE
CERTIFICATE OF CORRECTION

PATENT NO. : 4,922,973
DATED : May 8, 1990
INVENTOR(S) : Bernie Keneavy

It is certified that error appears in the above-identified patent and that said Letters Patent is hereby corrected as shown below:

Column 7, line 35, "n" should be --in--.

Column 10, line 2, "mom" should be --non--.

Signed and Sealed this

Twenty-eighth Day of July, 1992

Attest:

DOUGLAS B. COMER

*Attesting Officer*   *Acting Commissioner of Patents and Trademarks*